July 1, 1930.  F. H. BROWN  1,768,563
METHOD AND MEANS FOR FLOW METERING
Filed May 24, 1923   4 Sheets-Sheet 1
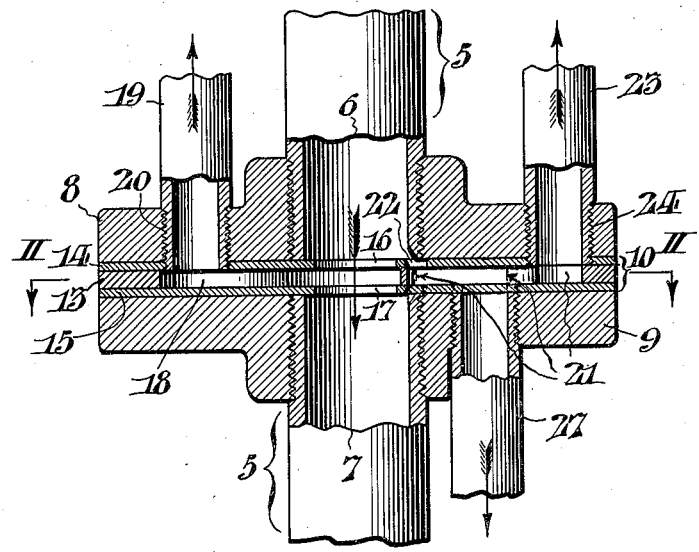
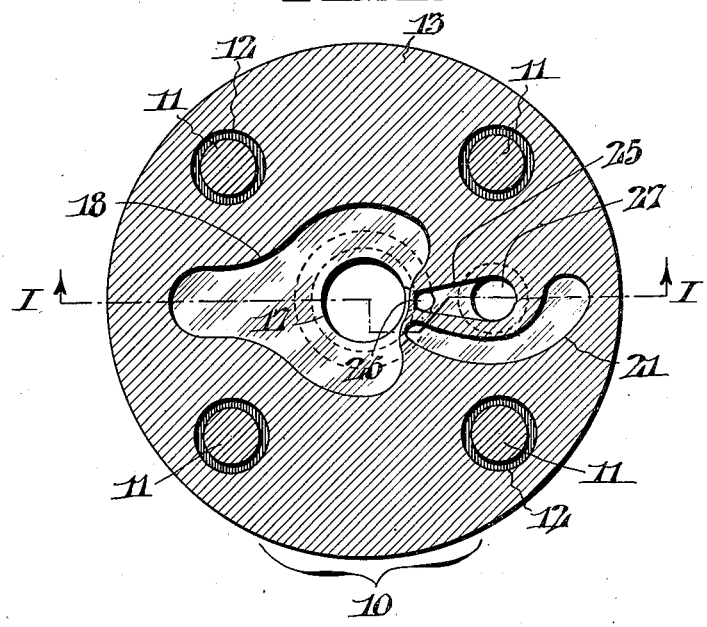
WITNESSES:
INVENTOR:
Francis H. Brown,
BY
ATTORNEYS.

July 1, 1930.   F. H. BROWN   1,768,563
METHOD AND MEANS FOR FLOW METERING
Filed May 24, 1923   4 Sheets-Sheet 2
FIG. III.
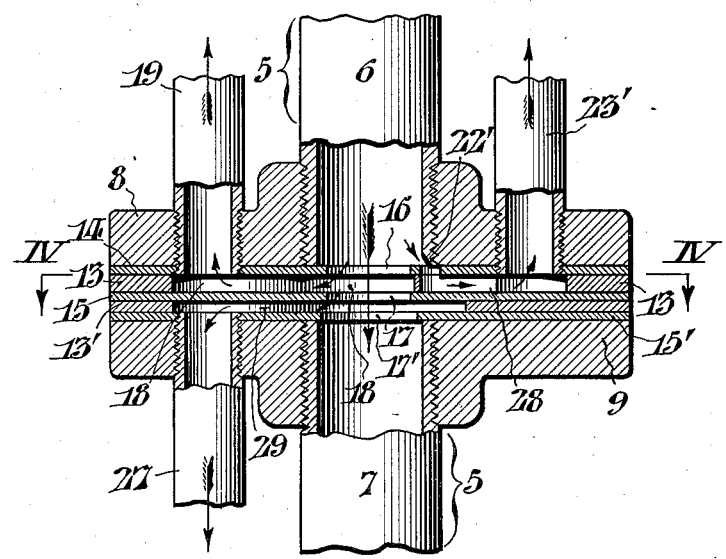
FIG. IV.
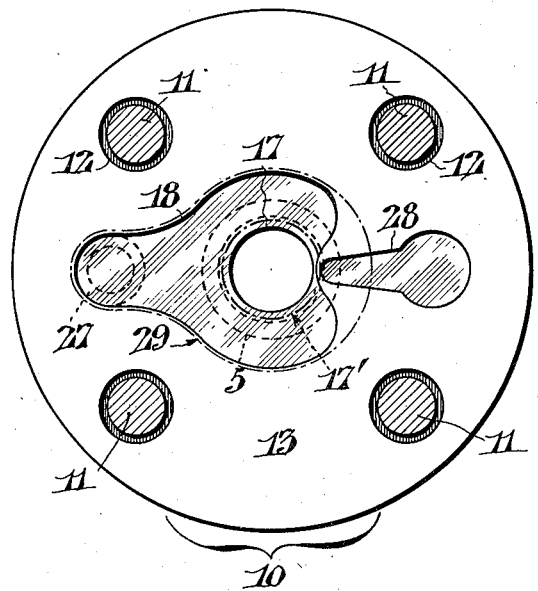
WITNESSES:
John C. Bergner
Alfred E. Tschinger
INVENTOR:
Francis H. Brown,
BY Fraley & Paul
ATTORNEYS.

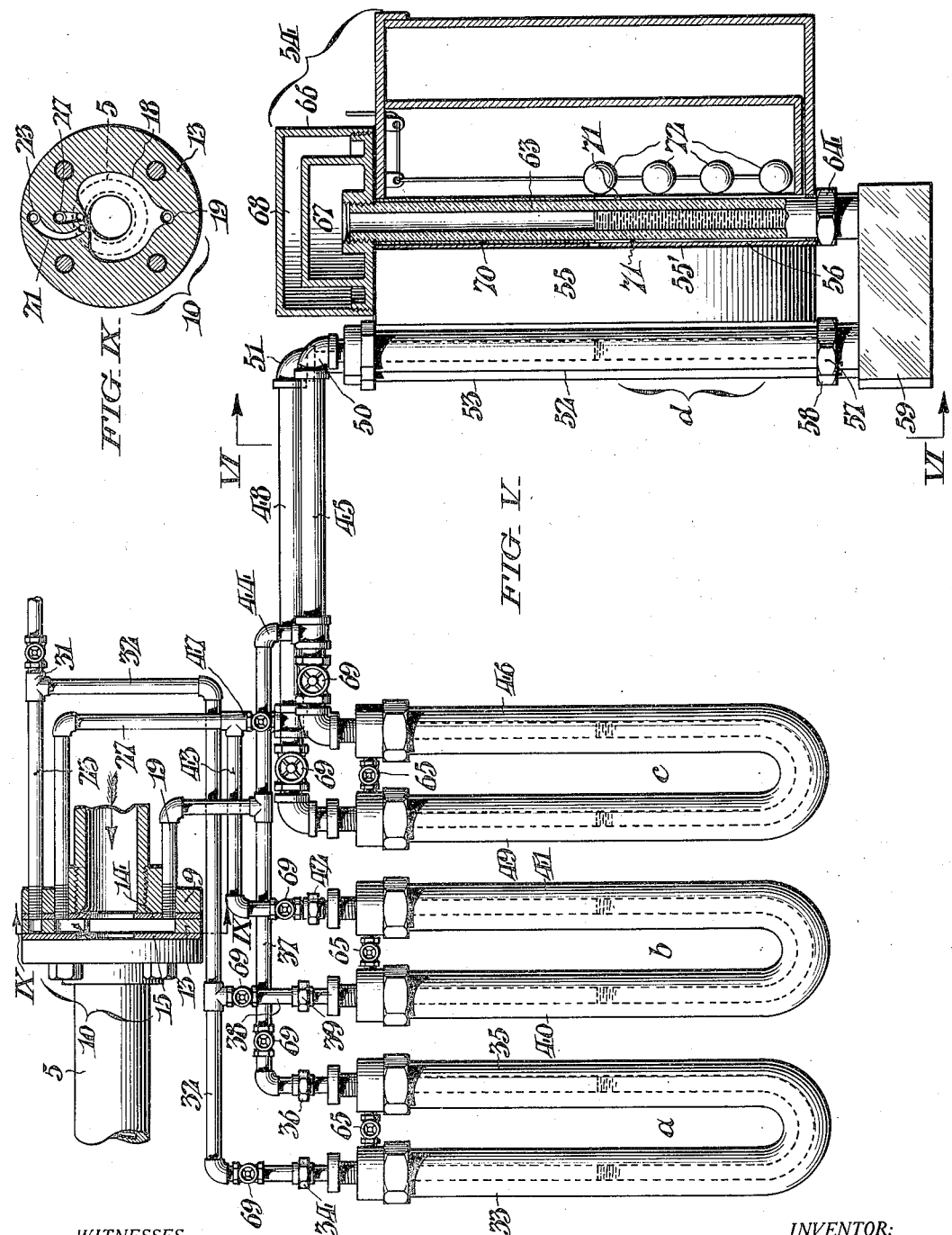

July 1, 1930. F. H. BROWN 1,768,563
METHOD AND MEANS FOR FLOW METERING
Filed May 24, 1923 4 Sheets-Sheet 4
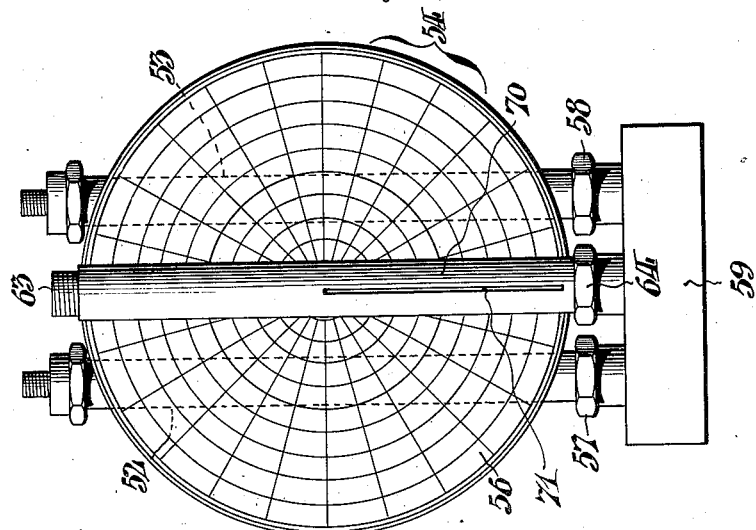
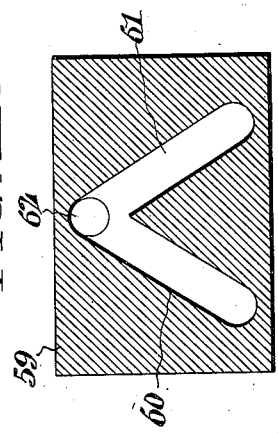
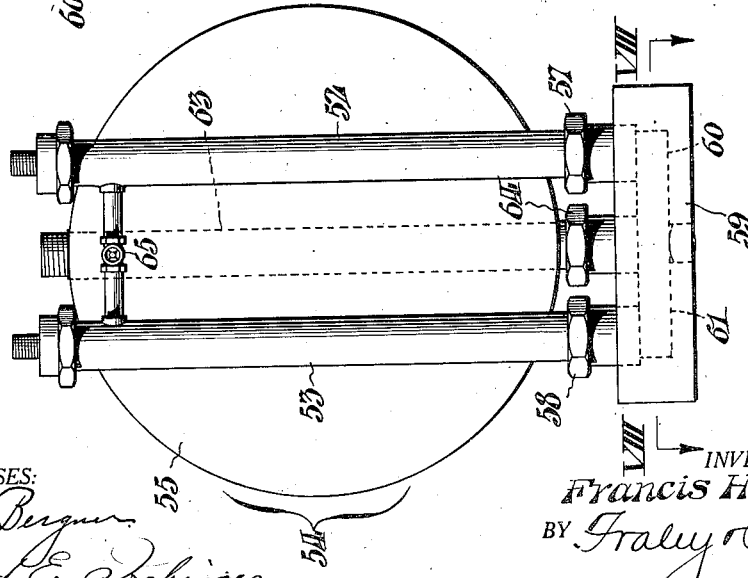
INVENTOR:
Francis H. Brown
BY Fraley Paul
ATTORNEYS.

Patented July 1, 1930

1,768,563

UNITED STATES PATENT OFFICE

FRANCIS H. BROWN, OF RIDLEY PARK, PENNSYLVANIA

METHOD AND MEANS FOR FLOW METERING

Application filed May 24, 1923. Serial No. 641,065.

This invention relates to pressure differential devices of the type adapted for interposition in a conduit through which a fluid flows to establish a pressure difference that bears a definite relation to the rate of flow, said devices usually comprising means provided with an orifice therethrough of less area than that of the conduit in which the device is associated. This more or less restricted opening or orifice device sets up differential pressures of the fluid at opposite sides thereof, and said—commonly termed—*leading and trailing* pressures are taken off from the up and down stream sides of said opening or orifice plate by sub-connections leading to any suitable indicating, or indicating and recording, instrument. Devices of the foregoing referred to type while answering many useful requirements, have inherent disadvantages and primarily, attention may be called to their impracticability for accurately defining the exact rate of flow therethrough under all conditions of pressure and velocity.

The primary object of the present invention is to provide an improved method and means for flow-metering including a pressure differential device whereby I am enabled to simultaneously obtain the static pressure and a plurality of dynamic pressures from which a constant is deduced that represents an exact index of the flow, and, therefore, directly indicates the true measure of said flow.

Another object of my invention is to overcome the above stated and other disadvantages by providing an orifice unit or device that will positively and automatically transmit the differential pressures—both static and dynamic—whereby the accuracy, efficiency and utility of such devices is very considerably enhanced.

A further object of this invention is to provide a pressure differential device which may be interposed between the conduit flanges in place of an ordinary gasket without disturbing its alignment.

With the foregoing and other objects in view—as will be apparent from the following description—this invention comprehends an orifice unit embodying protected zones or ports for diverting a static and a plurality of dynamic pressures, the average velocity difference between said latter pressures providing a mean or constant that constitutes an exact index of the actual flow under all conditions of pressure and velocity. The invention further embraces novel features of construction, arrangements and combinations of parts in adjunctively associated indicating, or indicating and recording means, which may also embody or be associated with any known means for integrating or totaling the flow.

In the further disclosure of the invention reference is to be had to the accompanying sheets of drawings illustrative of practical embodiments thereof, said drawings constituting a part of this specification and having like reference numerals applied to the same, or corresponding parts in all the views.

Fig. I is a part sectional plan of a conduit connection having my novel pressure differential device interposed therein, the sectional portion being taken approximately as indicated by the line 1—1 in Fig. II.

Fig. II is a sectional elevation taken substantially on the line II—II in the preceding figure, and as viewed in the direction of the arrows.

Fig. III is a similar sectional plan to Fig. I but illustrating a slightly modified form of the invention.

Fig. IV is a sectional elevation taken on the line IV—IV in the preceding figure, and looking in the direction of the arrows.

Fig. V is an assembly elevation illustrating an embodiment of the invention as a complete differential unit for flow metering, including standardizing and testing means, parts being broken away and in section for a clearer conception thereof.

Fig. VI is a rear elevation of the recording instrumentality as viewed on the line 6—6 in the preceding figure.

Fig. VII is a front elevation of the same.

Fig. VIII is a sectional plan taken on the line 8—8 in Fig. VI.

Fig. IX is a sectional view on the line 9—9 in Fig. V; and,

Fig. X is a longitudinal section of a modified form of unity tube, hereinafter more explicity described.

In the drawings a fluid conduit is generally designated by the numeral 5, and said conduit comprises sections 6, 7 having flanges 8, 9 respectively, between which is interposed my novel pressure differential device 10, said device being conveniently secured in place by bolts 11 passed through registering holes 12 in said flanges 8, 9, and device 10.

The pressure differential device 10, in accordance with my present invention, comprises a main or inner plate 13 and outer or covering plates 14, 15. As shown, the plates 14, 15 are conveniently circular in form and and of a diameter to fit neatly between the flanges 8, 9 aforesaid, while the plate 13 is likewise of a corresponding dimension, so that when the device is assembled and interposed into the conduit 5 it will register neatly between the flanges 8, 9 thereof, in place of the ordinary gasket—not shown.

These plates 14, 15 are conveniently provided with concentric apertures or orifices 16, 17 respectively, of a predetermined less diameter than that of the conduit 5, the former orifice 16 constituting the up-stream inlet to a curvilinear or substantially pear-shaped port 18 in the intermediate plate 13, while the latter orifice 17 serves as an outlet therefrom; or, in other words, as the downstream outlet. On the other hand the opposed and concentric apertures or orifices 16, 17 establish a constant ratio passage in the conduit 5, from each side of which and the intermediate or dynamic zone or cavity 18 *leading and trailing* pressures may be taken off, as will be hereafter fully set forth.

It is to be particularly noted that the formation of the curvilinear or substantially pear-shaped zone or port 18 provides a protected cavity, or dynamic pressure transmission means, open throughout to the entire perimeter of the apertures or orifices 16, 17. This curvilinear or substantially pear-shaped zone or port 18 is, furthermore, located in a plane exactly at right angles to the axis of the conduit 5 and fluid flow, thereby registering, at all times, the correct dynamic pressure of the flowing fluid at its *exact point of highest velocity;* that is to say, precisely in the orifice. This peculiar formation and disposition of the curvilinear or substantially pear-shaped dynamic port 18 establishes and ensures, a greater differential of pressure relative to the static—with an equal orifice opening—than any of the heretofore known means for producing such differentials. Furthermore this pear-shaped or dynamic port 18 provides the basis or foundation for obtaining a plurality of low pressures; in the present instance, a secondary low from which there is set up or established a third low pressure representative of the difference between said primary low and secondary low. This average difference between the primary and secondary low pressures affords a constant that positively indicates the exact rate of flow under all conditions of pressure and velocity, and it is the fundamental or underlying principle governing my present invention.

The curvilinear configured zone or pear-shaped port 18 also constitutes what I term the kinetic groove at which point the flowing fluid attains its highest velocity whereby the dynamic pressure of said fluid flowing through the conduit 5—in either direction—may be properly transmitted to the indicating, or indicating and recording instrument. In the present instance, I provide the kinetic groove or curvilinear configured zone or port 18 with a low pressure "primary" outlet in the form of a pipe connection 19 conveniently screw threaded at 20 through the flange 8, into the top covering plate 14; it being of course, well understood, that said pipe 19 provides a low pressure connection to the aforesaid indicating and recording instrument.

Similarly it is highly desirable with devices of the character under description that the static pressure of the fluid may be properly transmitted to the indicating, or indicating and recording instrument, when said fluid is flowing through the conduit 5; and, to this end, I form the plate 13 with an arcuate port or passage 21 having a communicating inlet 22 in the plate 14 affording connection with the upper section 6 of said conduit 5. The static pressure outlet from this port or passage 21 is in the form of a pipe connection 23 conveniently screw-threaded at 24 through the flange 8, into the top covering plate 14; it being, of course, well understood that said pipe 23 provides a high pressure connection to the aforesaid indicating, or indicating and recording, instrument.

In addition to the above referred to connections I provide my novel pressure differential device—as shown in Figs. I and II—with a secondary dynamic port or elongated passage 25 having an inlet 26, through the plate 15, affording communication with the lower section 7 of the conduit 5, and an outlet therefrom in the form of a pipe connection 27 screw-threaded through the bottom flange 9 into the covering plate 15; it being of course, well understood that said pipe 27 provides a secondary low or dynamic pressure connection to the hereinbefore referred to indicating, or indicating and recording, instrument.

In the modified form of pressure differential device 10 shown by Figs. III and IV, it will be observed that said pressure differential device includes additional intermediate and outer plates 13' and 15' respectively, while the static port or passage 28 is somewhat banjo-shaped in plan, but said configuration is a mere matter of design to afford better communication from the inlet 22' into the pipe connection 23'. On the other hand, it will be remarked that, the secondary low pressure dynamic zone in the form of an approximately pear-shaped port 29 in the lower intermediate plate 13', as indicated by the heavy dot-and-dash outline in Fig. IV. This port 29 is open to the aforesaid orifice 17 as well as a concentric orifice 17' in the supplemental plate 15'; and said pear-shaped port 29 affords communication between the lower section 7, of the conduit 5 and the secondary pipe connection 27—which is screw threaded through the flange 9 into the plate 15'—to the indicating, or indicating and recording instrument. It is noteworthy, also, that the orifice 17' is, preferably made of a slightly larger diameter than the orifice 17 so as to more effectively establish a differential through the port 29.

Having outlined my novel structure of pressure differential device 10, per se, I will now describe its association with means for indicating and recording flow variations and pressures, it being assumed that the embodiment shown by Figs. V to IX is by way of example only, while the fluid flow is presumed to be in the direction of the arrow shown thereon. In said figures, corresponding parts are generally referred to by the same designating numerals hereinbefore used. The fluid conduit 5, and interposed pressure differential device 10, in the embodiment illustrated, however have all of the pipe connections 19, 23 and 27 leading out from one side of said device 10; or, in other words the pipes 19, 23 and 27 are all connected through the flange 9, but it will be quite clear that they may be otherwise located, as desired. The static pressure outlet pipe 23 is branched by a tee 31, and connected through a pipe 32 to one leg 33 of a manometer tube $a$ by means of a coupling 34. The other leg 35 of said manometer tube $a$ is connected by means of a coupling 36 into a branch 37 from the aforesaid primary dynamic outlet 19; and said manometer tube $a$ thus provides and establishes a visible indication of the static or normal working pressure. Similarly I make use of a plurality of such manometer tubes $b$ and $c$ for visually indicating the primary and secondary dynamic pressures respectively, the former $b$ having a branch connection 38 joined by a coupling 39 to one leg 40, while the other leg 41 thereof is connected by a coupler 42 and branch 43 into the aforesaid "secondary" outlet 27. In like manner the manometer tube $c$ is provided with a branch connection 44 from the "primary" low 19 communicating into an elbowed pipe 45 in turn leading into one leg 46 of said manometer tube $c$, while a branch connection 47 from the secondary outlet 27 communicates into an elbowed pipe 48 in turn leading into the other leg 49.

These elbowed pipes 45, 48 are conveniently connected by T's or elbows 50, 51—respectively—to the upper ends of legs 52, 53 of a fourth manometer device $d$, hereinafter referred to as the *trinometer*, conveniently located in juxtaposition to an appropriate recording instrument comprehensively designated by the numeral 54. This recording instrument 54 may be of any well known type including an actuating or clockwork mechanism 55 adapted to rotate a dial 55'—Fig. V—on which is placed a sensitized and suitably calibrated chart 56,—Fig. VII.

The aforesaid legs 52, 53 are suitably connected by coupling glands 57, 58 respectively, into a base 59 having convergent ports 60, 61 at the junction whereof I provide an outlet passage 62 into which is fitted the lower end of a glass tube 63—hereinafter referred to as the "unity" tube—by means of a coupling gland 64. Thus it will be easily understood that the unity tube 63 serves to establish a mean or average difference between the pressures entering and influencing the aforesaid tubes or legs 52, 53. Each of the aforesaid manometers $a$, $b$ and $c$, as well as the legs 52 and 53, of the trinometer $d$, are provided with a cross connection having an interposed pressure equalizer or valve 65. In like manner I provide a similar cross-connection—not shown—fitted with an equalizer valve between the primary low 52 and the unity tube 63, the purpose and function whereof is to get static pressure in the said tube 63 to set the working pressure for operation of the device, and said connections will be obvious to those conversant with the art without further explanation or description.

Appropriately fitted air tight on the upper end of the unity tube 63 is a cellular head 66, the inner section whereof communicates with the tube 63 and constitutes a counter-pressure air chamber 67, while the outer and concentric section is hermetically sealed to provide a vacuum spacing 68 about said air chamber, thereby preventing change of air pressure in said unity tube 63 and its chamber 67 consequent upon variations of temperature in the atmosphere surrounding the device. Shut-off valves 69 are fitted in connection with each manometer unit $a$, $b$ and $c$, as well as the trinometer $d$, whereby any one or more of said units may be closed down in the event of accident, and thus prevent wastage or loss of the pressure responsive element therein.

The aforesaid unity tube 63 is surrounded by an appropriate light excluding casing 70 with the exception of a longitudinal slot 71 of appropriate dimension to emit a fine ribbon or ray of light therethrough, from an enclosed incandescent medium or light 72 onto the sensitized chart 56 revolvably mounted in close juxtaposition thereto—as shown. It will be noted that the unity tube 63 and tubes 52, 53, of the trinometer $d$, are filled with mercury to a zero level on the chart 56 that is suitably calibrated for recording "flow pressure."

In Fig. X, I have shown a slightly modified form of unity tube 73 the same having a globular end constituting a counter pressure air chamber 74; while said tube 73 is substantially enclosed by a concentric casing 75 providing a vacuum space 76 thereabout for the purpose hereinbefore set forth.

Obviously the cellular head 66, or casing 75, may be dispensed with, and an open-ended mercury column be employed in place of the unity tube 63 or 73.

It is noteworthy that the "trinometer" $d$ may be readily and very advantageously used in conjunction with any known type or form of pressure differential device establishing a high and low pressure while its "unity tube" 63 or 73 may be utilized to indicate and record the differential pressure so established.

The U-tubes $a$, $b$ and $c$, as well as the trinometer $d$, are filled with mercury—and suitably calibrated—for visibly indicating flow pressures in the well known way, but I desire to particularly emphasize the use and combination of the manometer $c$ and the unity tube 63 as being entirely new and providing a differential between the "primary" and "secondary" dynamic pressures that establishes the constant hereinbefore referred to.

Furthermore the manner of rendering the record on the sensitized chart 56 permanent by immersion in clear water is well known, hence further description thereof is deemed unnecessary; while the operation of the apparatus will be readily understood by those conversant with the art of flow metering without further explanation.

From the foregoing description it will be obvious that when fluid is flowing in the direction of the arrows through the conduit 5, the leading and trailing pressures will be taken off from the up and down stream sides of the pressure differential device 10, respectively. In other words the leading pressure will be a measure of the static flow through the inlet 22, port or passage 21 and pipe 23, while the trailing pressures will be a measure of the primary and secondary dynamic flows through the curvilinear port 18, and pipe 19, as well as the inlet 26, secondary port 25 and pipe 27, respectively. Or, in the modified form shown by Figures III and IV, the inlet 22', port 28 and pipe 23'; and the difference between the flows passing through the port 18 and pipe 19; and port 29 and pipe 27. As a result of the foregoing arrangement of parts it will be quite clear that the velocity differences between the primary and secondary trailing or dynamic pressures provides a constant that represents the exact rate of flow under all conditions of pressure and velocity. This feature is of primary importance, as it will be apparent that by my invention I am enabled to obtain the static pressure and a plurality of dynamic pressure flow indications simultaneously; the taking of the primary and secondary dynamic pressure flow conditions at the highest point of velocity—it is to be specially emphasized—forms a new principle and basis for calculation in flow metering, heretofore unknown. This new principle or manner of metering fluid flow conditions furnishes a constant that accurately represents the changing difference between the primary and secondary dynamic pressures due to velocity. Hence, it will be readily understood that a progressive increase in velocity gives a corresponding progressive increase in pressure difference between the primary and secondary dynamic pressures, while a progressively reduced velocity gives a corresponding progressively reduced pressure difference between said primary and secondary dynamic pressures. Or, more tersely expressed, when there is no flow, the static, the primary dynamic, and the secondary dynamic pressures are all equal.

Obviously the plates 13, 14 and 15,—or 13, 14, 15, 13' and 15'—may be suitably connected together in any of the old and well known ways to incorporate the pressure differential device 10 into a connected unit, whereby its easy interposition or removal into—or from—a conduit is greatly facilitated. Furthermore it will be clear that such a device is positive in action and requires no attention when once installed.

Still further it is noteworthy that the orifices 16, 17 may be of any desired shape, form or configuration, while the groove or substantially pear-shaped zone or port 18 constitutes a protected area or cavity open throughout the entire perimeter of the orifices at right angles to the stream, thereby registering at all times the *correct pressure of the flowing fluid at its exact point of*

*highest velocity;* that is, precisely in the orifice device.

The pressure differential device 10 hereinbefore described may be formed of three or more comparatively thin sheets of suitable metal mounted in the joint between the two sections of pipe 6, 7 thus forming a gasket and thereby providing an extremely simple, inexpensive and serviceable unit which may be interposed in the space ordinarily occupied by the customary pipe gasket. Furthermore it will be noted my device 10 can be interposed in a pipe line without interfering with its normal alignment, with all the three pressure transmission connections 19, 23 and 27, aligning, thereby avoiding error in pressure at the recording instrument due to difference in altitude of the fluid column.

Briefly summing up it will be readily comprehended from the foregoing that my invention provides a novel method and means for metering the flow of fluids, vapors, air, gases and the like that yield to any force or influence tending to effect a change in their form, quality or condition. The invention is further adapted for easy association with a fluid conduit whereby I obtain the static or normal—high—pressure of the flowing fluid in said conduit; a primary dynamic—low—pressure that is lower than the static when flow of the fluid exists; and a secondary dynamic—low—pressure the standard of which is greater than the primary dynamic but less than the static when flow exists. Thus, when a flow exists or is established in the conduit 5, the two low pressures will vary coincidentally with and in a certain definite and positive ratio with respect to the static, with respect to each other, and with respect to the variations in velocity of the fluid being metered; the difference between the primary and secondary dynamic pressures providing a constant that is a positively true index of the quantity or amount of flow per unit of time at any and all standards of static pressure, and any and all rates of flow.

Furthermore, as is well known to all conversant with flow metering, the use of a plate or other orifice device having an opening less than the bore of the conduit in which it is mounted, causes a difference in pressure at opposite sides of said opening in the fluid being metered, when there is any flow. These different pressures are usually referred to as the "high" and "low" pressures, and the difference between them forms a basis for calculating the rate and amount of flow passing through the conduit. In simple terms, the difference of pressure increases as the square of the velocity of the flow through the orifice. However none of the orifice devices heretofore employed take the dynamic pressure in the orifice but to one side thereof where it is subject to disturbing influences causing error; and, in order to overcome said defect I devised my novel pressure differential device 10 whereby an absolutely protected area is provided, to wit:—the curvilinear configured zone or port 18, *that receives its pressure always from the exact point of highest velocity.* This pressure is taken off throughout the entire junctional perimeter of the orifice 16—17, and the zone or port 18 at exact right angles to the stream of flowing fluid, thereby producing a greater differential of pressure with the same flow velocity for a given size of orifice, and referred to as the primary low. Further the provision of the additional port 25, which is located in the down stream face of the device 10, and hereinbefore designated the secondary low, always registers a less difference between it and the static than the primary low does, and the difference between these two dynamic pressures provides the constant that represents actual flow.

In connection with the complete assembly of my invention it is noteworthy that the three manometers $a$, $b$ and $c$, respectively visualize the static, primary dynamic, and secondary dynamic pressure. These latter two pressures are transmitted through the elbow pipes 45, 48 to the legs 52, 53 of the trinometer $d$, and due to the connection of said legs into the ports 60, 61 having a common outlet to the "unity" tube 63 there is set up and indicated therein an average difference between said primary and secondary dynamic pressures; or, in other words, the difference of two dynamic pressures due to flow. This pressure difference or "unity" is an exact index of the flow, and, directly represents the true measure of flow.

While mercury has been referred to as the pressure responsive element employed it is to be understood that I may utilize any other non-mixing, or non-comminglable element or elements affected by all variations, however slight, of pressure and velocity. Such variations evidenced in the unity tube 63 or 73 will be accurately shadowgraphed and recorded on the sensitized chart 56, thereby providing a permanent record of the flow for any given or desired period of time and a means for ascertaining the total flow for such intervals of time.

Further it is to be noted that a calculated volume of air at atmospheric pressure in the measuring and stabilizing "unity" tube 63 or 73, and its chamber 67 or 74 respectively, will balance the mercury columns at zero, with the static, primary and secondary dynamic pressures when there is no flow. When flow is established, the mercury or other pressure responsive element in the primary and secondary manometers $b$, $c$, will be unbalanced, their dynamic pressures both being lower than the static due to and in a degree, corresponding to the fluid velocity passing through the device 10. Thus the primary $b$ will show a lower pressure than the secondary $c$ while the difference between these two varying dynamic pressures will be indicated by the level of the mercury or other presure responsive element in the unity tube 63, 73; and the variation thereof will be shadowgraphically recorded on the sensitized chart 56, as hereinbefore set forth.

In conjunction with the lights 72 hereinbefore referred to I may employ any convenient means for reflecting, amplifying, intensifying or otherwise varying the same, thereby correspondingly affecting the record produced on the sensitized chart 56. Further, it is to be remarked that the counter pressure in the air chamber 67 carries a varying pressure—when flow exists—corresponding to the pressure established due to flow, the same representing the fourth pressure or "unity" created by the primary and secondary dynamic pressures. While I have described and shown the "unity" pressure as being recorded shadowgraphically by means of the unity tube 63, it is to be distinctly understood the same may be separately indicated and recorded, for example I may substitute a mechanically operated indicating pointer and a recording pen. This pointer and pen may have associated lights (or an ink device of any known type) adapted to trace records upon separate sections of the sensitized chart 56 thereby obtaining a record of the pressure differences and fluctuations in addition to the flow variations. As before stated, when there is no flow, all pressures that is, the primary and secondary dynamic as well as the air cushion counter pressures, will be the same as the static, with all the respective indicating columns at zero. It is worthy of particular note that the "unity" or measuring tube 63 is destined to contain three or more non-mixing elements; in the present case, air, water, and mercury. Thus it will be easily understood that when the mercury is at zero and water, condensation of the steam, or other static pressure is introduced into the tube 63 there will be trapped a volume of air thereabove forming an elastic cushion which automatically acquires and adjusts itself to the pressure that is established in the communicating measuring or "unity" tube. Now, if the quantity of water introduced in said tube is under a pressure corresponding with the normal working or operating standard of pressure that varies in operation coincidentally with— and in a definite proportional ratio to—each of the primary and secondary dynamic pressures, there will be established a fourth pressure that is the difference between said primary and secondary dynamic pressures.

Among the many advantages inhering to my invention are, its simplicity of construction, efficiency in operation and absolute reliability in transmitting the most minute variations in flow pressures. Furthermore, it will be readily apparent from the foregoing, that devices of the type described are exceptionally sensitive and adaptable for a great variety of uses in conjunction with means for indicating, recording, registering, measuring and regulating purposes, while the clockwork 55 may have associated therewith any appropriate integrating device; therefore I desire it to be clearly understood that the embodiments shown and described are by way of example only. Accordingly the right is hereby reserved to make all such reasonable deviations and other combinations of the several parts that fairly fall within the scope of the following claims.

Having thus described my invention, I claim:

1. The method of flow metering which consists in constricting the flow being metered to produce differential pressures, transmitting the static pressure and a plurality of dynamic pressures from about a protected zone at the region of constriction or highest flow velocity, and in deducing therefrom a constant representative of the exact flow under all pressure and velocity conditions.

2. The method of flow metering which consists in constricting the flow being metered to produce differential pressures, transmitting the static pressure, as well as a high and a low dynamic pressures, from about the point of constriction or highest flow velocity, and deducing from said high and low dynamic pressure an average differential representative of the exact flow under all pressure and velocity conditions.

3. The method of flow metering which consists in constricting the flow being metered to produce differential pressures, simultaneously transmitting the static pressure and a plurality of different and varying dynamic pressures, one of said dynamic presures being taken-off from the up-stream side and the other on the down-stream side of the constricted flow, utilizing the difference between such dynamic pressures to deduce a constant representative of the flow under all conditions of pressure and velocity, and shadowgraphing said different and varying dynamic pressures.

4. The method of flow metering which consists in constricting the flow being metered to produce differential pressures, simultaneously transmitting from about the point of highest flow velocity the static pressure and a plurality of different and varying dynamic pressures with correlated differential variations between the same, the pressure differences between certain of said plurality of dynamic pressures bearing a definite relation to the rate of flow, and deducing from said pressure differences a constant representative of the actual fluid flow under all conditions of pressure and velocity.

5. A pressure differential flow-metering device for association in a fluid conduit having an orifice with passages at right angles thereto adapted to produce and transmit differential flow pressures, one of said passages taking-off the static pressure and the others simultaneously taking-off a plurality of dynamic pressures at the region of highest flow velocity.

6. A pressure differential unit for interposition in a fluid conduit for the purpose of flow-metering, said unit embodying relatively-spaced and mutually-engaging plate elements, a plurality of said elements having apertures that afford spaced concentric orifices communicating into an intervening port formed in the mutually-engaging elements and disposed at right angles to said apertures, means providing an outlet from said port for transmitting dynamic pressure, and said mutually-engaging elements embodying supplementary ports, one of which has inlet communication from the up-stream side and the other from the down-stream side thereof, whereby the static pressure and an additional dynamic pressure are respectively transmitted.

7. A pressure differential unit for interposition in fluid conduits for the purpose of flow-metering, said unit embodying relatively-spaced and mutually-engaging plate elements, some of said elements having apertures affording a plurality of paralleled concentric orifices communicating with ports formed in the mutually-engaging elements and disposed at right angles to the aforesaid apertures, means providing outlets from said ports for transmitting differential dynamic pressures, and said unit also embodying a separate port communicating with the up-stream side whereby static pressure is transmitted.

8. A pressure differential unit, for interposition in fluid conduits for the purpose of flow-metering, embodying relatively-spaced and mutually-engaging plate members, the outer members being apertured to afford spaced orifices connecting with a relatively-larger port formed in the mutually-engaging members and disposed at right angles to said orifices, means providing an outlet from said port for transmitting primary dynamic pressure; and said unit also embodying auxiliary ports for separately transmitting the static pressure and a secondary dynamic pressure.

9. A pressure differential unit for interposition in fluid conduits for the purpose of flow-metering, said unit embodying relatively-spaced and mutually-engaging disks, some of said disks being apertured to provide graduated concentric spaced orifices with the intervening disks embodying relatively larger and eccentrically disposed ports, means providing outlets from said ports for transmitting varying dynamic pressures, and one of said intervening disks having a substantially smaller port with an inlet on the up-stream side of the unit whereby static pressure is transmitted.

10. A pressure differential device for interposition in fluid conduits for the purpose of flow-metering comprising an intermediate and outer disks, the outer disks having concentric orifices and the intermediate disk a communicating port, an outlet connection from said port for transmitting dynamic pressure, and said intermediate disk also embodying auxiliary ports, one of which has an inlet on the up-stream side of the device and the other an inlet on the down-stream side thereof, adapted to, respectively, transmit the static and a secondary dynamic pressure.

11. A pressure differential device for interposition in fluid conduits for the purpose of flow-metering comprising outer disks with an intermediate one having a curvilinear port therein, said outer disks being provided with orifices opening into the curvilinear port, an outlet connection from the curvilinear port for transmitting dynamic pressure, the intermediate disk embodying an arcuate port with an inlet on the up-stream side of the device for transmitting static pressure, and said intermediate disk also having an elongated auxiliary port with an inlet on the down-stream side of the unit for transmitting a secondary dynamic pressure.

12. A pressure differential device for interposition in fluid conduits for flow-metering comprising an intermediate and outer disk members, said outer members having concentric orifices and the intermediate members a connecting relatively larger port which surrounds said orifices, the intermediate disk embodying auxiliary ports, one of which has an inlet from the up-stream side and the other an inlet on the down-stream side of the device, an outlet from said first mentioned port for transmitting dynamic pressure, and outlets from the auxiliary ports whereby the static pressure and a secondary dynamic pressure are transmitted.

13. A pressure differential device for interposition in fluid conduits for purposes of flow-metering, comprising intermediate and outer disks, said outer disks having orifices of less peripheral contour than the conduit and the intermediate disk a communicating curvilinear port, an outlet connection from said curvilinear port for transmitting primary dynamic pressure, the intermediate disk embodying an elongated port with an inlet through one of the outer disks and an outlet connection for transmitting static pressure, and said intermediate disk also having an auxiliary arcuate port with an inlet through the other outer disk and an outlet connection whereby a secondary dynamic pressure is diverted and transmitted.

14. A pressure differential device for interposition in fluid conduits for the purpose of flow-metering, comprising an intermediate disk and outer face plates having coaxial orifices of less peripheral contour than that of the fluid conduit and the intermediate disk a communicating curvilinear port, an outlet connection from said curvilinear port for transmitting primary dynamic pressure, the intermediate disk having an elongated port therein with an inlet in the face plate on the up-stream side of the device and an outlet connection for transmitting static pressure, and said intermediate disk also embodying an auxiliary port with an inlet through the face plate on the down-stream side of the device and an outlet connection whereby a secondary dynamic pressure is transmitted.

15. A pressure differential disk unit composed of superposed disks, for interposition in fluid conduits for the purpose of flow-metering, having in its outer elements apertures providing an orifice of less peripheral contour than the conduit in which it is used and through which the fluid flows, the intermediate element of said unit having a relatively-larger port therein for transmitting primary dynamic pressure from said orifice, and said unit embodying another port for transmitting static pressure with an auxiliary port for the transmission of a secondary dynamic pressure.

16. A pressure differential disk unit for flow-metering having an orifice by which the fluid flow is throttled and embodying a series of independently located pressure transmission ports, a relatively larger port of the series transmitting low dynamic pressure directly from the orifice, another port transmitting static pressure through the unit, and a further port for transmitting a secondary relatively-lower dynamic pressure.

17. In apparatus for flow metering, the combination of a differential unit composed of apertured plates providing co-planar ports adapted to simultaneously establish a plurality of different and varying pressures and correlated variations between the same, connections for transmitting said pressures, and associated means for indicating and recording such pressure variations.

18. In apparatus for flow metering, the combination of a differential unit embodying apertured discous elements providing independent co-planar ports adapted to simultaneously take-off a plurality of different and varying pressures with correlated variations between them, a plurality of associated manometers, means conducting the respective different pressures to individual manometers, and a co-ordinate trinometer establishing a constant therefrom which represents the actual flow under all conditions of pressure and velocity.

In testimony whereof, I have hereunto signed my name at Philadelphia, Pennsylvania, this 22nd day of May, 1923.

FRANCIS H. BROWN.